(12) United States Patent
Cha et al.

(10) Patent No.: US 7,911,534 B2
(45) Date of Patent: Mar. 22, 2011

(54) VIDEO PROCESSING APPARATUS, ANCILLARY INFORMATION PROCESSING APPARATUS AND VIDEO PROCESSING METHOD

(75) Inventors: Tae-hwan Cha, Yongin-si (KR); Byung-jo Jun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1306 days.

(21) Appl. No.: 11/439,216

(22) Filed: May 24, 2006

(65) Prior Publication Data

US 2007/0002173 A1 Jan. 4, 2007

(30) Foreign Application Priority Data

Jul. 4, 2005 (KR) .................. 10-2005-0059928

(51) Int. Cl.
*H04N 7/00* (2006.01)
(52) U.S. Cl. ........................... 348/465; 348/468
(58) Field of Classification Search .................. 348/468, 348/465, 554, 558, 607, 473, 476–478, 561, 348/562, 581, 582; *H04N 7/00, 5/44, 9/74, H04N 5/46, 5/21, 3/27*
See application file for complete search history.

(56) References Cited

U.S. PATENT DOCUMENTS

| | | | | |
|---|---|---|---|---|
| 6,462,782 B1 * | 10/2002 | Honda et al. | ............. | 348/465 |
| 7,046,298 B2 * | 5/2006 | Kuzumoto et al. | ...... | 348/465 |
| 7,599,003 B2 * | 10/2009 | Suzuki et al. | ............ | 348/465 |

FOREIGN PATENT DOCUMENTS

| | | |
|---|---|---|
| CN | 1125501 | 6/1996 |
| CN | 1451241 | 10/2003 |
| JP | 11-308481 | 11/1999 |
| JP | 2001-177739 | 6/2001 |
| KR | 1995-0016336 | 6/1995 |
| KR | 2000-025918 | 5/2000 |
| KR | 2005-0055839 | 6/2005 |

* cited by examiner

*Primary Examiner* — Sherrie Hsia
(74) *Attorney, Agent, or Firm* — Roylance, Abrams, Berdo & Goodman L.L.P.

(57) ABSTRACT

A video processing apparatus including a display comprises a filter for receiving a video signal containing video information and ancillary information related to the video information and having a predetermined frequency. The filter passes a component corresponding to the frequency of the video signal. An ancillary information extractor extracts the ancillary information from the video signal passed by the filter. A video processor processes the video signal so that the ancillary information extracted by the ancillary information extractor is displayed on the display. The video processing apparatus is able to enhance the reliability of ancillary information extraction by removing the influence of noise.

12 Claims, 4 Drawing Sheets

VIDEO PROCESSING APPARATUS, ANCILLARY INFORMATION PROCESSING APPARATUS AND VIDEO PROCESSING METHOD

CROSS-REFERENCE TO RELATED APPLICATIONS

This application claims the benefit under 35 U.S.C. §119 of a Korean Patent Application No. 2005-0059928, filed on Jul. 4, 2005, in the Korean Intellectual Property Office, the entire disclosure of which is hereby incorporated by reference.

BACKGROUND OF INVENTION

1. Field of Invention

The present invention relates to a video processing apparatus, an ancillary information processing apparatus and a video processing method. More particularly, the present invention relates to a video processing apparatus, an ancillary information processing apparatus and a video processing method, which are capable of enhancing the reliability of ancillary information extraction by removing the influence of noise.

2. Description of the Related Art

A video processing apparatus such as TVs receives video signals containing predetermined video according to digital TV broadcasting and cable TV broadcasting from a broadcasting station, and then performs video processing with respect to the received video signals to output video. Further, the video processing apparatus receives video signals from various kinds of video devices such as VCRs and DVDs, and then performs video processing with respect to the video signals.

A configuration of such a conventional video processing apparatus is schematically shown in FIG. 1. The video processing apparatus 1 of FIG. 1 includes a video decoder 10 for decoding and outputting various input video signals, a deinterlacer 20 for converting decoded video signals into progressive signals, a scaler 30 for performing video processing such that progressive signals are appropriately displayed, and a display 40 for displaying the video processed signals.

In particular, the video decoder 10 includes two analog-to-digital converters (ADCs) 11 and 12 for receiving analog format CVBS (Composite Video Baseband Signal) signals, Y signals (luminance signals), C signals (chrominance signals), RGB signals or the likes, and converting them into digital format signals, a comb part 13 for separating luminance signals and chrominance signals from the CVBS signals, a color space converter 14 for converting RGB signals into YUV signals or the likes, a color decoder 15 for separating original chrominance signals from the encoded chrominance signals, a soft mixer 16 for mixing CVBS signals and RGB signals, an image enhancer 17 for controlling amplitudes or offsets of signals, and a format converter 19 for converting output signals into formats required for systems.

In a video signal input to the video decoder 10, may be included various ancillary information as well as information on video displayed on the display 40. As examples of the ancillary information, there are used caption data for aurally handicapped persons (hereinafter, referred to as "closed caption data"), teletexts, wide screen signals, vertical interval time codes and the likes. Such ancillary information is contained in a specific line within a vertical blanking interval (VBI) of a video signal. For example, in the case of NTSC (National Television System Committee) television systems, the closed caption data are encoded in the 21st and/or 284th line of a video signal.

The video decoder 10 of the conventional video processing apparatus 1 includes a VBI slicer 18 corresponding to such ancillary information. The VBI slicer 18 receives video signals output from the ADC 11, performs decoding to extract the ancillary information, and then outputs it to the format converter 19. FIG. 2 is a waveform diagram showing a portion corresponding to a 21st line containing closed caption data in a CVBS signal. A video signal corresponding to the 21st line contains a sync signal 51, a color burst signal 52, a clock run-in signal 53 and caption data 54 being ancillary information. The clock run-in signal 53 is a sine waveform signal whose maximum and minimum values are binarized as logic states of "1" and "0", and has seven waveforms whose clock frequency is approximately 503 KHz. The caption data 54 has a start bit ("001") and 16-bit data (two ASCII data and two parity bits). The VBI slicer 18 performs decoding according to a bit rate of the clock run-in signal 53 with respect to an input video signal, and then extracts the caption data 54.

However, for example, if a VCR tape is deteriorated in the case of a VCR signal as a video signal, or if a signal is received in a weak electric field area in case of a broadcasting signal, there may exist noise in the video signal. As such, if noise is contained in a video signal, there occurs an error when ancillary information is extracted by the VBI slicer 18, so that captions or teletext characters can be broken, or that wide screen operations do not go well. Further, if there occurs an error in its own extraction of a clock run-in signal due to the influence of noise, ancillary information per se, may be unreliable.

To solve these problems, there can be a method of removing noise using a filter in a step of receiving video signals. On the other hand, there is a problem that video information of video signals per se, can be damaged in the filtering process.

SUMMARY OF THE INVENTION

Accordingly, it is an aspect of the present invention to provide a video processing apparatus, an ancillary information processing apparatus and a video processing method, which are capable of enhancing the reliability of ancillary information extraction by removing the influence of noise.

The foregoing and/or other aspects of exemplary embodiments of the present invention can be achieved by providing a video processing apparatus including a display, the apparatus comprising a filter for receiving a video signal containing video information and ancillary information having a predetermined frequency as information with respect to the video information, and passes a component corresponding to the frequency of the video signal, an ancillary information extractor for extracting the ancillary information from the video signal passed by the filter, and a video processor for performing video processing on the video signal so that the ancillary information extracted by the ancillary information extractor is displayed on the display.

According to an exemplary aspect of the present invention, the video signal has frequency information indicating the frequency of the ancillary information. The filter comprises a low pass filter for passing a component below the frequency of the video signal, and a filter control unit extracts the frequency information from the video signal and controls the low pass filter to change a cutoff frequency in accordance with the frequency information.

The foregoing and/or other exemplary aspects of the present invention can be achieved by providing a video processing apparatus including a display, the apparatus comprising a filter for receiving a video signal containing video information and ancillary information having a predetermined frequency as information with respect to the video information, and passes a component corresponding to the frequency of the video signal, an ancillary information extractor for extracting the ancillary information from the video signal passed by the filter, and a video processor for performing video processing on the video signal so that video corresponding to the video information is displayed on the display based on the ancillary information extracted by the ancillary information extractor.

According to an exemplary aspect of the present invention, the video signal has frequency information indicating the frequency of the ancillary information, and the filter comprises a low pass filter for passing a component below the frequency of the video signal; and a filter control unit for extracting the frequency information from the video signal and controlling the low pass filter to change a cutoff frequency in accordance with the frequency information.

The foregoing and/or other exemplary aspects of the present invention can be achieved by providing an ancillary information processing apparatus for a video processing apparatus including a display, a video processor for performing video processing on a video signal containing video information and ancillary information having a predetermined frequency as information with respect to the video information so that the ancillary information is displayed on the display, the apparatus comprising a filter for receiving the video signal and passing a component corresponding to the frequency of the video signal, and an ancillary information extractor for extracting the ancillary information from the video signal passed by the filter and outputting the ancillary information to the video processor.

According to an exemplary aspect of the present invention, the video signal has frequency information indicating a frequency of the ancillary information. The filter comprises a low pass filter for passing a component below the frequency of the video signal, and a filter control unit for extracts the frequency information from the video signal and controls the low pass filter to change a cutoff frequency in accordance with the frequency information.

The foregoing and/or other exemplary aspects of the embodiments of the present invention can be achieved by providing an ancillary information processing apparatus for a video processing apparatus including a display; a video processor for performing video processing on a video signal containing video information and ancillary information having a predetermined frequency as information with respect to the video information so that a video corresponding to the video information is displayed on the display based on the ancillary information. The apparatus comprising a filter for receiving the video signal and passing a component corresponding to the frequency of the video signal; and an ancillary information extractor extracts the ancillary information from the video signal passed by the filter and outputs the ancillary information to the video processor.

According to an exemplary aspect of the present invention, the video signal has frequency information indicating a frequency of the ancillary information. The filter comprises a low pass filter for passing a component below the frequency of the video signal, and a filter control unit extracts the frequency information from the video signal and controls the low pass filter to change a cutoff frequency in accordance with the frequency information.

The foregoing and/or other exemplary aspects of the embodiments of the present invention can be achieved by providing a video processing method of a video processing apparatus, the method comprising the steps of receiving a video signal containing video information and ancillary information having a predetermined frequency as information on the video information, and passing a component corresponding to the frequency of the video signal, extracting the ancillary information from the passed video signal, extracting the video information from the video signal and performing video processing with respect thereto, and displaying the extracted ancillary information together with video corresponding to the video information.

According to an exemplary aspect of the present invention, the video signal has frequency information indicating a frequency of the ancillary information. The passing passes a component below the frequency of the video signal in accordance with the frequency information.

The foregoing and/or other exemplary aspects of the present invention can be achieved by providing a video processing method of a video processing apparatus, the method comprising receiving a video signal containing video information and ancillary information having a certain frequency as information with respect to the video information, and passing a component corresponding to the frequency of the video signal, extracting the ancillary information from the passed video signal, extracting the video information from the video signal and performing video processing with respect to the video signal based on the ancillary information, and displaying video based on the processed video information.

According to an exemplary aspect of the present invention, the video signal has frequency information indicating a frequency of the ancillary information; and the passing passes a component below the frequency of the video signal in accordance with the frequency information.

BRIEF DESCRIPTION OF THE DRAWINGS

The above and/or other exemplary aspects and advantages of the embodiments of the prevent invention will become apparent and more readily appreciated from the following description of the exemplary embodiments, taken in conjunction with the accompany drawings, in which like reference numerals will be understood to refer to like parts, components and structures, where.

DETAILED DESCRIPTION OF EXEMPLARY EMBODIMENTS

Figure 1:
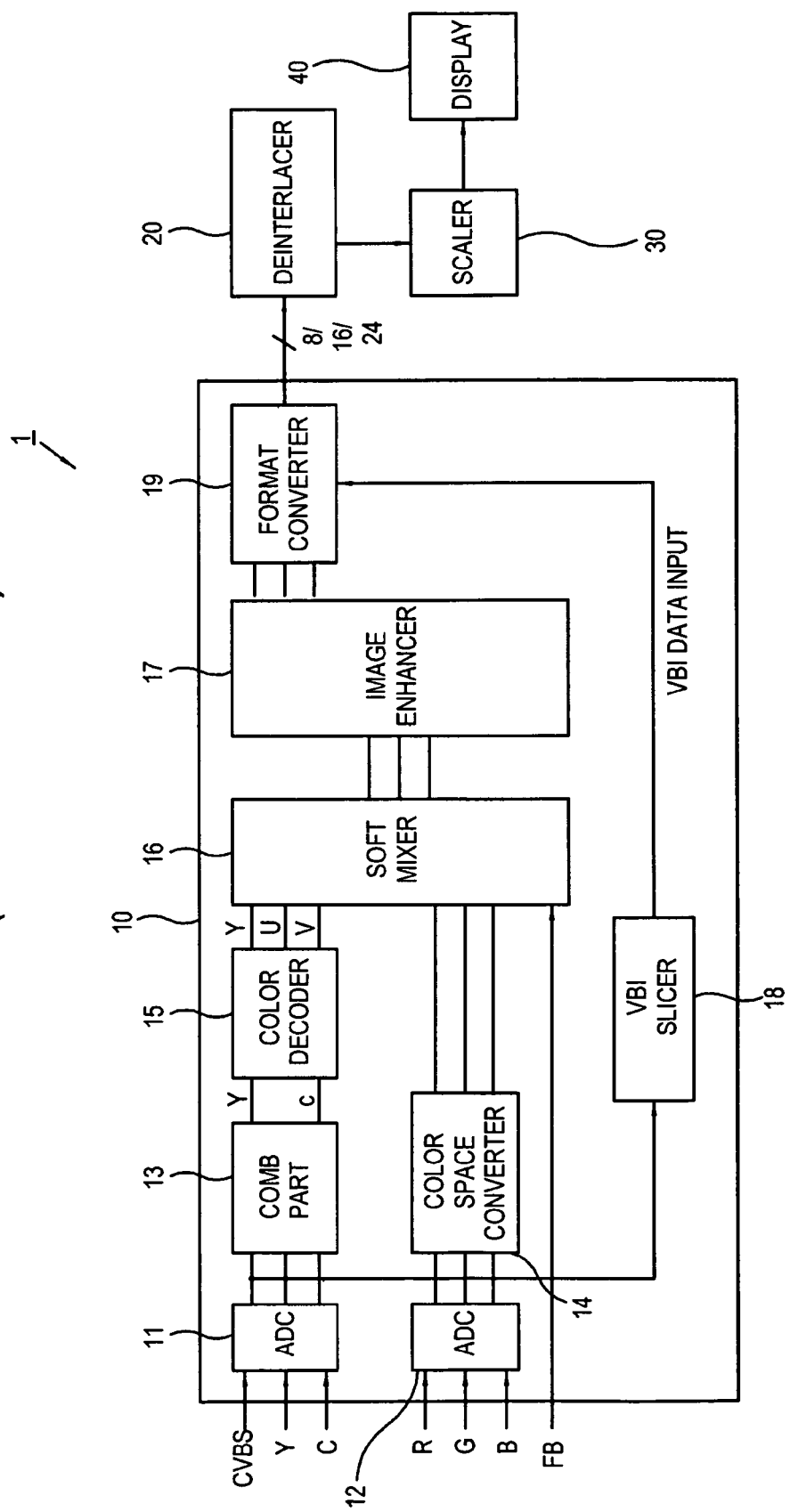
FIG. 1 is a block diagram schematically illustrating a configuration of a conventional video processing apparatus.

Reference will now be made in detail to exemplary embodiments of the present invention, examples of which are illustrated in the accompanying drawings, wherein as noted above, like reference numerals refer to like elements throughout.

Figure 3:
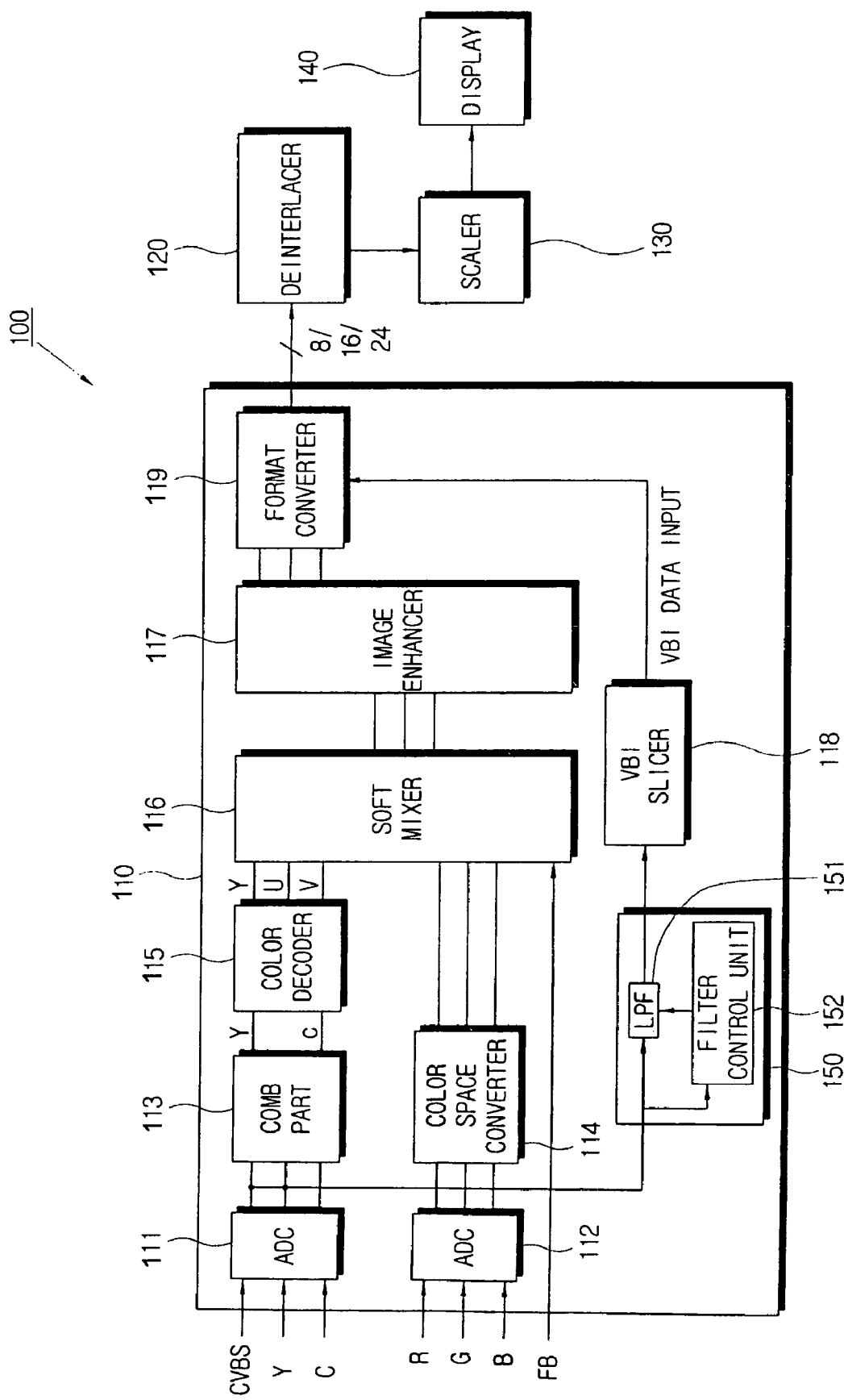
FIG. 3 is a block diagram schematically illustrating a configuration of a video processing apparatus according to an exemplary embodiment of the present invention.

FIG. 3 is a block diagram schematically illustrating a configuration of a video processing apparatus according to an exemplary embodiment of the present invention. The video processing apparatus 100 receives video signals containing predetermined video according to digital TV broadcasting and cable TV broadcasting from a broadcasting station, or receives video signals from various kinds of video devices such as VCRs and DVDs and then performs video processing with respect to the received video signals to output video. In particular, the video processing apparatus 100 of the exemplary embodiment removes noise of a video signal containing additional information such as closed caption data as well as video so that the additional information is extracted without errors, thereby providing a high quality video.

The video processing apparatus 100 of the exemplary embodiment, as shown in FIG. 3, includes a video decoder 110, a deinterlacer 120, a scaler 130 and a display 140. The video decoder 110 receives various formats of video signals, and then appropriately performs decoding with respect to the received video signals to obtain video information encoded in the signals and ancillary information on video represented by the ancillary information.

The deinterlacer 120 receives an output of the video decoder 110, being connected to an output terminal of the video decoder 110. The deinterlacer 120 also performs deinterlacing with respect to video signals decoded by the video decoder 110. In other words, the deinterlacer 120 converts interlaced video into non-interlaced video, that is, progressive video. If the display 140 is implemented with CRTs (Cathode Ray Tubes) or the likes in which the interlaced video is displayed on the display 140, the deinterlacer 120 can be excluded from the video processing apparatus 100 as the deinterlacer 120 corresponds to the type of the display 140.

The scaler 130 receives output signals of the deinterlacer 120 being connected to an output terminal of the deinterlacer 120. The scaler 130 also appropriately performs video processing with respect to the received signals output from the deinterlacer 120 so that video is smoothly displayed on the display 140 based on the video processed signals. The display 140 receives the video processed signals from the scaler 130 and then displays video based on the signals.

The video decoder 110 according to an exemplary embodiment of the present invention, as shown in FIG. 3, includes two ADCs 111 and 112, a comb part 113, a color space converter 114, a color decoder 115, a soft mixer 116, an image enhancer 117 and a format converter 119. Each of the ADCs 111 and 112 receives analog format video signals having various formats and converts them into digital format video signals.

The ADC 111 receives CVBS (Composite Video Baseband Signal) in a format of an analog television signal before it is modulated onto an RF carrier, Y signal being a signal representing a luminance in an analog television signal and C signal being a signal representing a chrominance, and then performs analog to digital conversion with respect thereto. Meanwhile, the ADC 112 performs analog to digital conversion with respect to RGB signals directly received from video devices such as computer systems.

The comb part 113 receives output signals of the ADC 111 being connected to output terminals of the ADC 111, and if the input signals are CVBS signals, the comb part 113 separates luminance signal (Y signals) and chrominance signals (C signals) from the output signals. The color decoder 115 receives luminance signal (Y signals) and chrominance signals (C signals) being output signals of the comb part 113 being connected to output terminals of the comb part 113, and performs decoding with respect to the received chrominance signals (C signals) to separate and output original chrominance signals encoded in the chrominance signals (C signals). As an example of the chrominance signals, there are used "I" and "Q" signals in NTSC (National Television System Committee) television systems, and "U" and "V" signals in PAL (Phase-Alternating Line) and other television systems.

The color space converter 114 receives output signals of the ADC 112 being connected to output terminals of the ADC 112, and performs color space conversion with respect to the received RGB signals to convert them into YUV signals, for example. The soft mixer 116 receives output signals of the color decoder 115 and the color space converter 114 being connected to output terminals of the color decoder 115 and the color space converter 114, and also receives a selection signal (FB, Fast Blank) indicating user's selection. The soft mixer 116 selectively outputs any one of video signals received from the color decoder 115 and the color space converter 114 depending on an input selection signal.

The image enhancer 117 receives output signals of the soft mixer 116 being connected to output terminals of the soft mixer 116, and performs control of amplitudes and offsets of the received signals in accordance with a predetermined setup. To enhance quality of video, the image enhancer 117 also can control characteristics of the received video signals in terms of contrast, brightness, saturation, hue, and the like.

The format converter 119 receives output signals of the image enhancer 117 being connected to output terminals of the image enhancer 117, and appropriately converts a format of the received signals to provide them to the deinterlacer 120. For example, the format converter 119 converts and then outputs video signals so that a bit rate of the video signals (8 bits, 16 bits, 24 bits, and so on.) corresponds to fixed setup, and performs control of an order of "Y", "U" and "V", setup of signal levels or the like.

The video processing apparatus 100 according to an exemplary embodiment of the present invention includes a filter 150 and a VBI slicer 118. The filter 150 receives luminance signals (Y signals) in output signals of the ADC 111, and passes a component corresponding to a predetermined frequency in the luminance signals (Y signals). The VBI slicer 118 extracts ancillary information from the passed luminance signals (Y signals) and then outputs it to the format converter 119.

Figure 2:
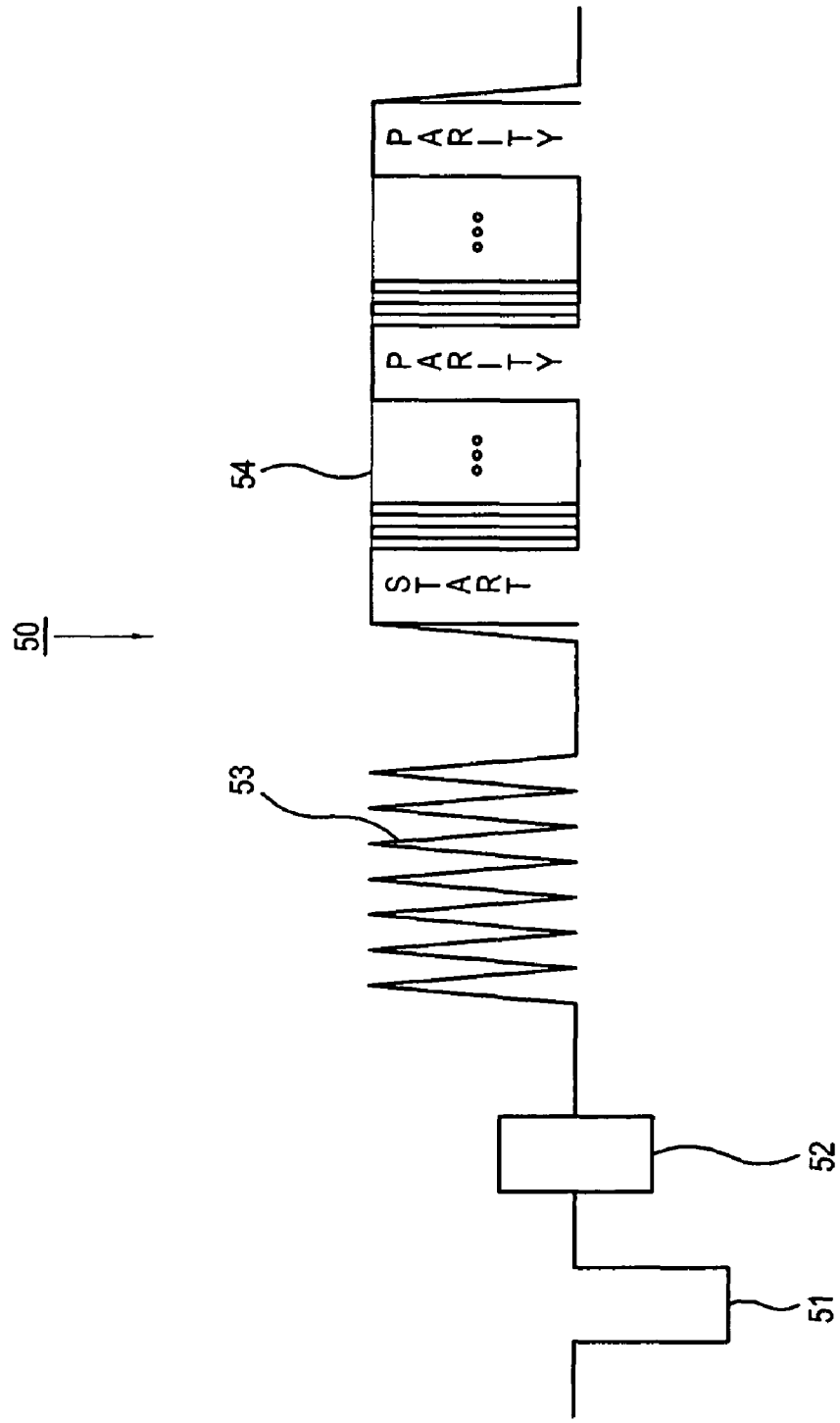
FIG. 2 is a waveform diagram showing a portion corresponding to a 21st line containing closed caption data in a CVBS signal.

A luminance signal (Y signal) of the exemplary embodiment, contains various ancillary information as well as video information corresponding to video displayed on the display 140. The ancillary information of the exemplary embodiment may be closed caption data, teletexts, wide screen signals and time codes. The ancillary information is contained in a vertical blanking interval (VBI) of a video signal. For example, in NTSC television systems, closed caption data are encoded in the 21st line of the video signal 50 as shown in FIG. 2. In this case, the VBI slicer 118 detects closed caption data in the 21st line according to a sync signal 51 of the video signal 50. The VBI slicer 118 extracts closed caption data in the 21st line and provides the extracted caption data 54 to the format converter 119. The VBI slicer 118 according to an exemplary embodiment of the present invention is an example of an ancillary information extractor.

The format converter 119 arranges caption data 54 at an appropriate location of an output signal in accordance with a predetermined format, and then outputs them. The output caption data 54 are processed by the scaler 130 and then displayed together with video through the display 140. Meanwhile, the scaler 130 can perform video processing so that video is appropriately displayed on the display 140 based on control signals such as wide screen signals or the likes. The format converter 119, the deinterlacer 120 and the scaler 130 of the exemplary embodiment are examples of a video processor according to exemplary implementations of the present invention.

The ancillary information according to an embodiment of the present invention has a predetermined frequency. A video signal of the exemplary embodiment includes frequency information representing the frequency of the ancillary information. The VBI slicer 118 detects frequency information of ancillary information and extracts the ancillary information based on the frequency information. The frequency information of the ancillary information is a clock run-in signal 53. In this case, the VBI slicer 118 performs decoding according to a bit rate of the clock run-in signal 53, and then extracts caption data 54.

The filter 150 is provided prior to the VBI slicer 118 and passes a frequency band corresponding to ancillary information of a video signal 50 and cuts off a frequency band over it. The filter 150 of the exemplary embodiment includes a low pass filter (LPF) 151 and a filter control unit 152. The LPF 151 passes components below a cutoff frequency of a video signal 50 and cuts off frequency components over it, setting a frequency corresponding to a clock run-in signal 53 as a cutoff frequency. That is, the LPF 151 passes signals of ancillary information having a frequency corresponding to the clock run-in signal 53 and cuts off signals in which noise being a frequency component higher than the frequency can be included.

The LPF 151 of the exemplary embodiment can change the cutoff frequency. The filter control unit 152 detects a clock run-in signal 53 from a received video signal 50 and estimates frequency of the clock run-in signal, that is, a bit rate of a clock run-in signal. Then, the filter control unit 152 controls the LPF 151 to set the estimated bit rate of the clock run-in signal. For example, if the ancillary information is a closed caption, a cutoff frequency of the LPF 151 is set as 600 KHz (a frequency of a clock run-in signal is about 503 KHz), and if the ancillary information is Gemstar2x, a cutoff frequency of the LPF 151 is set as 1100 KHz (a frequency of a clock run-in signal is about 1006 KHz). That is, the filter 150 of the exemplary embodiment performs optimal filtering for removal of noise, changing the frequency corresponding to the type of the ancillary information contained in the video signal 50.

As described above, the video processing apparatus 100 of the exemplary embodiment, in the case of deterioration of a VCR tape or broadcasting reception in a weak electric field area, can extracts ancillary information with respect to even video signals including noise without errors in accordance with the type of the ancillary information.

Figure 4:
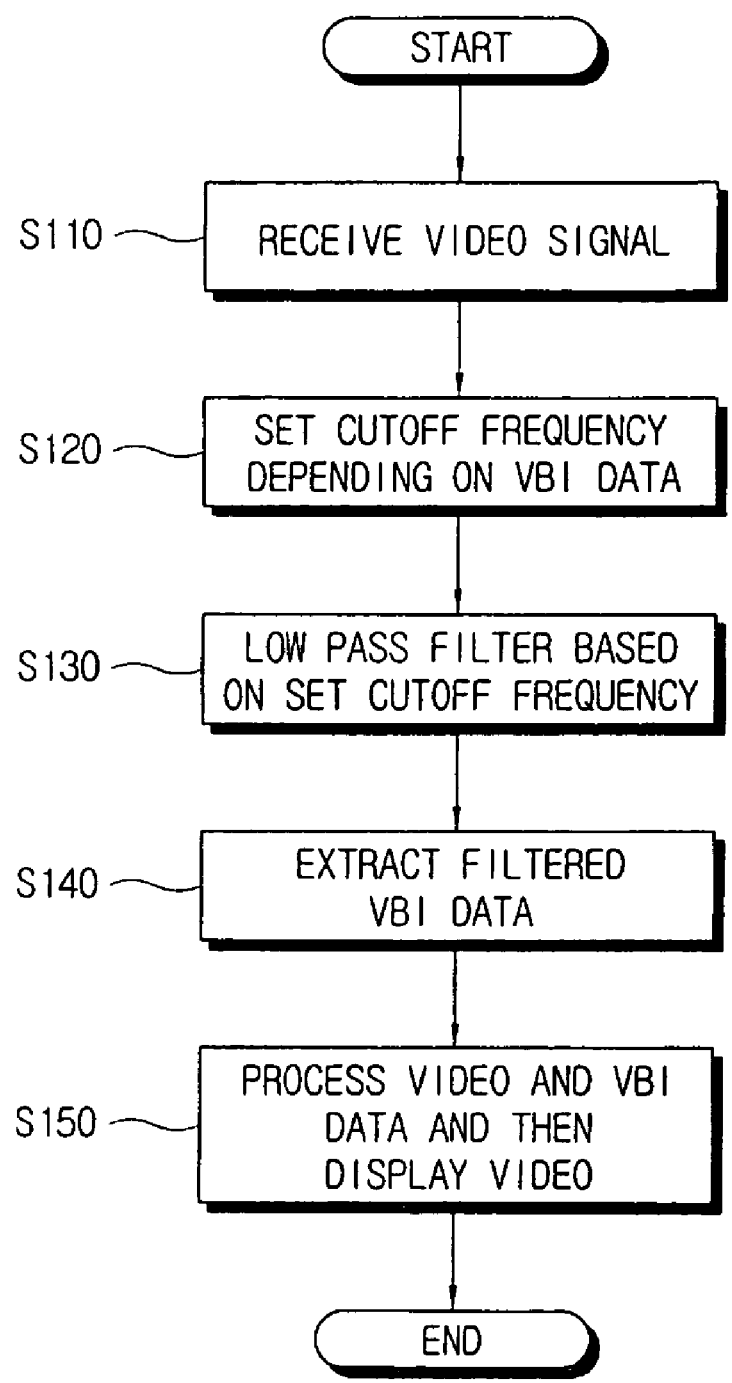
FIG. 4 is a flowchart schematically illustrating main operations of a video processing apparatus according to an exemplary embodiment of the present invention.

FIG. 4 is a flowchart schematically illustrating main operations of a video processing apparatus according to an exemplary embodiment of the present invention. The video decoder 110 of the video processing apparatus 100 receives a video signal in which various ancillary information containing output signals of a VCR is encoded at operation S110. The filter control unit 152 of the filter 150 detects frequency information of VBI data and sets a frequency indicated by the frequency information as a cutoff frequency of the LPF 151 at operation S120.

The LPF 151 passes a component below the set cutoff frequency with the input video signal, and cuts off a component over the cutoff frequency at operation S130. The VBI slicer 118 extracts VBI data according to a bit rate indicated by the frequency information in a specific line of the filtered and input signal, and outputs them to the format converter 119 at operation S140. The format converter 119, the deinterlacer 120 and the scaler 130 perform video processing so that the extracted ancillary information is displayed together with video on the display 140 or that video is appropriately displayed on the display 140 based on the extracted ancillary information, and display the video at operation S150.

Further, embodiments of the present invention is not limited to a video processing apparatus such as a TV system but applies to various kinds of devices such as a VBI slicer, a video decoder and a microcomputer including the filter 150 and the VBI slicer 118. Depending on the implementation, the slicer, the video decoder, the microcomputer or the like are examples of an ancillary information processing apparatus for a video processing apparatus of the exemplary embodiments of the present invention.

As described above, exemplary embodiments of the present invention can provide a video processing apparatus, an ancillary information processing apparatus and a video processing method, which are capable of enhancing the reliability of ancillary information extraction by removing the influence of noise.

In addition, embodiments of the present invention can provide a video processing apparatus, an ancillary information processing apparatus and a video processing method, which are capable of reliably extracting the ancillary information extraction corresponding to various kinds of ancillary information.

Although certain exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A video processing apparatus, comprising:
    a display;
    a filter for receiving a video signal comprising video information and ancillary information related to the video information and having a predetermined frequency, wherein the filter passes a component corresponding to the frequency of the video signal;
    an ancillary information extractor for extracting the ancillary information from the video signal passed by the filter; and
    a video processor for performing video processing on the video signal to display ancillary information extracted by the ancillary information extractor on the display;
    wherein the filter performs filtering by changing a threshold frequency used for filtering according to a type of the ancillary information.

2. The apparatus according to claim 1, wherein the video signal comprises frequency information indicating the frequency of the ancillary information; and
    the filter comprises:
        a low pass filter for passing a component below the frequency of the video signal; and
        a filter control unit for extracting the frequency information from the video signal and controlling the low pass filter to change a cutoff frequency in accordance with the frequency information.

3. A video processing apparatus, comprising:
    a display;
    a filter for receiving a video signal comprising video information and ancillary information related to the video information and having a predetermined frequency, wherein the filter passes a component corresponding to the frequency of the video signal;

an ancillary information extractor for extracting the ancillary information from the video signal passed by the filter; and a video processor for performing video processing on the video signal to display video corresponding to the video information on the display based on the ancillary information extracted by the ancillary information extractor;

wherein the filter performs filtering by changing a threshold frequency used for filtering according to a type of the ancillary information.

4. The apparatus according to claim 3, wherein the video signal comprises frequency information indicating the frequency of the ancillary information; and the filter comprises:
a low pass filter for passing a component below the frequency of the video signal; and
a filter control unit for extracting the frequency information from the video signal and controlling the low pass filter to change a cutoff frequency in accordance with the frequency information.

5. An ancillary information processing apparatus for processing a video signal containing video information and ancillary information related to the video information and having a predetermined frequency, the apparatus comprising:

a filter for receiving a video signal and passing a component corresponding to a frequency of the video signal; and an ancillary information extractor for extracting ancillary information from the video signal passed by the filter and outputting the ancillary information;

wherein ancillary information is displayed;

wherein the filter performs filtering by changing a threshold frequency used for filtering according to a type of the ancillary information.

6. The apparatus according to claim 5, wherein the video signal comprises frequency information indicating a frequency of the ancillary information; and the filter comprises:
a low pass filter for passing a component below the frequency of the video signal; and
a filter control unit for extracting the frequency information from the video signal and controlling the low pass filter to change a cutoff frequency in accordance with the frequency information.

7. An ancillary information processing apparatus for processing a video signal containing video information and ancillary information related to the video information and having a predetermined frequency, the apparatus comprising:

a filter for receiving a video signal and passing a component corresponding to a frequency of the video signal; and an ancillary information extractor for extracting ancillary information from the video signal passed by the filter and outputting the ancillary information;

wherein video information is displayed; and wherein the filter performs filtering by changing a threshold frequency used for filtering according to a type of the ancillary information.

8. The apparatus according to claim 7, wherein the video signal comprises frequency information indicating a frequency of the ancillary information; and the filter comprises:
a low pass filter for passing a component below the frequency of the video signal; and
a filter control unit for extracting the frequency information from the video signal and controlling the low pass filter to change a cutoff frequency in accordance with the frequency information.

9. A video processing method, comprising:

receiving a video signal comprising video information and ancillary information related to the video information and having a predetermined frequency;

passing a component corresponding to the frequency of the video signal;

extracting the ancillary information from the passed video signal;

extracting the video information from the video signal and performing video processing with respect thereto; and displaying the extracted ancillary information with video corresponding to the video information;

wherein the passing operation further comprises changing a threshold frequency used for passing according to a type of the ancillary information.

10. The method according to claim 9, wherein the video signal comprises frequency information indicating a frequency of the ancillary information; and the passing comprises passing a component below the frequency of the video signal in accordance with the frequency information.

11. A video processing method, comprising:

receiving a video signal comprising video information and ancillary information related to the video information and having a predetermined frequency;

passing a component corresponding to the frequency of the video signal;

extracting the ancillary information from the passed video signal;

extracting the video information from the video signal and performing video processing with respect to the video signal based on the ancillary information; and displaying video based on the processed video information;

wherein the filter performs filtering by changing a threshold frequency used for passing according to a type of the ancillary information.

12. The method according to claim 11, wherein the video signal comprises frequency information indicating a frequency of the ancillary information; and the passing comprises passing a component below the frequency of the video signal in accordance with the frequency information.

* * * * *